US012797964B2

(12) United States Patent
Ishitani

(10) Patent No.: US 12,797,964 B2
(45) Date of Patent: Nov. 17, 2026

(54) TILTING MECHANISM

(71) Applicant: SUGINO MACHINE LIMITED, Namerikawa City (JP)

(72) Inventor: Akihiro Ishitani, Namerikawa City (JP)

(73) Assignee: SUGINO MACHINE LIMITED, Namerikawa City (JP)

( * ) Notice: Subject to any disclaimer, the term of this patent is extended or adjusted under 35 U.S.C. 154(b) by 135 days.

(21) Appl. No.: 18/981,618

(22) Filed: Dec. 15, 2024

(65) Prior Publication Data

US 2025/0249517 A1 Aug. 7, 2025

(30) Foreign Application Priority Data

Feb. 6, 2024 (JP) ................................ 2024-016501

(51) Int. Cl.
*B23B 31/08* (2006.01)
*B23C 3/12* (2006.01)

(52) U.S. Cl.
CPC ................ *B23B 31/08* (2013.01); *B23C 3/12* (2013.01); *B23B 2220/08* (2013.01); *B23B 2270/027* (2013.01); *B23C 2270/027* (2013.01)

(58) Field of Classification Search
CPC ................ B23B 31/08; B23B 2220/08; B23B 2270/027; B23C 3/12; B23C 2270/027
See application file for complete search history.

(56) References Cited

U.S. PATENT DOCUMENTS

| | | | | |
|---|---|---|---|---|
| 1,782,633 A * | 11/1930 | Schiltz | B23B 31/08 408/127 |
| 4,984,942 A * | 1/1991 | Holtz | B23B 31/08 408/127 |
| 7,507,057 B2 * | 3/2009 | Beier | B23B 51/101 408/57 |
| 7,726,919 B1 * | 6/2010 | Rottler | B23C 3/056 408/127 |

(Continued)

FOREIGN PATENT DOCUMENTS

| | | | |
|---|---|---|---|
| DE | 102004049037 A1 * | 4/2006 | B23B 1/08 |
| DE | 10 2004 049 037 B4 | 1/2009 | |

(Continued)

OTHER PUBLICATIONS

Extended European Search Report mailed on Jul. 7, 2025 in a corresponding European Patent Application No. 25152231.4 (10 pages).

(Continued)

*Primary Examiner* — Ryan J. Walters
(74) *Attorney, Agent, or Firm* — United IP Counselors, LLC

(57) ABSTRACT

A tilting mechanism includes: a housing including a body chamber extending along a reference axis, a receiving surface located at a distal end portion of the body chamber, and an abutment surface; a body disposed inside the body chamber in a tiltable manner with respect to the reference axis, the body including a first spherical surface coming in contact with the receiving surface, and a contact surface (Continued)

coming in contact with the abutment surface, an elastic member disposed in the body chamber to urge the body toward a distal end; and an anti-rotation member disposed in the housing to prevent rotation of the body.

19 Claims, 6 Drawing Sheets

(56) References Cited

U.S. PATENT DOCUMENTS

| | | | | |
|---|---|---|---|---|
| 9,009,946 | B2 * | 4/2015 | Steger | B23Q 1/70<br>408/127 |
| 12,090,560 | B2 * | 9/2024 | Muto | B23B 31/08 |
| 12,472,563 | B2 * | 11/2025 | Yanagihara | B23B 29/046 |
| 12,496,642 | B2 * | 12/2025 | Yanagihara | B23C 3/12 |

FOREIGN PATENT DOCUMENTS

| | | | | |
|---|---|---|---|---|
| EP | 1052044 | A1 * | 11/2000 | B23B 31/08 |
| JP | H07-223158 | A | 8/1995 | |
| JP | 2020-066120 | | 4/2020 | |

OTHER PUBLICATIONS

Office Action mailed on Aug. 4, 2026, in corresponding Japanese Patent Application No. 2024-016501 (6 pages).

* cited by examiner

TILTING MECHANISM

CROSS-REFERENCE TO RELATED APPLICATIONS

This application claims the benefit of priority to Japanese Patent Application No. 2024-016501, filed on Feb. 6, 2024, the entire contents of which are hereby incorporated by reference.

BACKGROUND

1. Technical Field

The present invention relates to a tilting mechanism.

2. Description of the Background

A deburring tool attached to a robot or the like is known (for example, JP2020-66120 A; hereinafter, Patent Literature 1). The deburring tool of Patent Literature 1 includes a cylindrical housing, a spindle body having a center disk and being tiltable and loosely fitted and supported in the housing, a piston that presses the center disk toward the distal end, a spring that urges the piston toward the distal end, a separation ring that is provided between the piston and the spring, and a flow path that supplies air between the separation ring and the piston.

BRIEF SUMMARY

In the deburring tool of Patent Literature 1, when the spindle body is tilted, a moment load acts on the piston, and the piston may be difficult to move. It is thus difficult to reduce the load required for the spindle body to tilt.

An object of the present invention is to provide a tilting mechanism capable of tilting a spindle body even when a moment load acting on the spindle body is relatively small.

A first aspect of the present invention provides a tilting mechanism, including:

- a housing including
  - a body chamber extending along a reference axis,
  - a receiving surface located at a distal end portion of the body chamber, and
  - an abutment surface,
- a body disposed inside the body chamber in a tiltable manner with respect to the reference axis, the body including
  - a first spherical surface configured to come in contact with the receiving surface, and
  - a contact surface configured to come in contact with the abutment surface,
- an elastic member disposed in the body chamber, the elastic member configured to urge the body toward a distal end; and
- an anti-rotation member disposed in the housing to prevent rotation of the body.

The tilting mechanism is, for example, a deburring tool, a hand, or a chuck. The attachment is, for example, a spindle body, a hand, or a chuck. The attachment is disposed at a distal end of the body. The attachment may be actuated by a working fluid.

The tip tool is, for example, a cutter, a brush, or a polishing bar.

The housing may include a flange chamber. The flange may be disposed inside the flange chamber. The flange chamber may be located at a distal end of the housing. The flange chamber is connected to the body chamber. The contact surface may be located at a distal end of the flange. The receiving surface may be located at a distal end of the flange.

The housing may include a case and a cover. The cover is detachably attached at a distal end portion of the case. The cover may have a receiving surface, a flange chamber or an abutment surface. The anti-rotation pin may include a shaft portion, a head portion, and a fastening portion. The shaft portion abuts against the receiving portion. The anti-rotation pin may fasten the cover to the case.

The center of the first spherical surface is located substantially on the reference axis. Herein, “substantially” means within 0.5 mm from the reference axis, preferably within 0.2 mm. The center of the first spherical surface is located on the attachment axis. Preferably, the center of the first spherical surface is located at a central portion of the flange in the thickness direction.

The anti-rotation pin may extend parallel to the reference axis. The receiving portion may extend parallel to the reference axis. The flange may include one or more receiving portions. The anti-rotation pins may be inserted into each of the receiving portions. The plurality of the receiving portions may be evenly arranged in the circumferential direction. The receiving portion is a hole or a groove.

The anti-rotation pin may extend perpendicularly to the reference axis. A plurality of the anti-rotation pins may be arranged on a pin installation plane perpendicular to the reference axis. Preferably, the pin installation plane passes through the center of the first spherical surface. A plurality of anti-rotation pins may be evenly arranged in the circumferential direction. The receiving portion may extend perpendicular to the attachment axis. The receiving portion may extend parallel to the attachment axis. The receiving portion may pass through the flange in the direction of the attachment axis. The receiving portion, which is a receiving groove, may have an abutment surface. Preferably, the abutment surface of the receiving portion is a plane passing through the attachment axis.

The working fluid source is, for example, a compressor, an oil hydraulic unit, or a water hydraulic unit. The working fluid is, for example, compressed air, hydraulic oil, water, working coolant, preferably compressed air. The ejector is, for example, a tank of a silencer, a hydraulic unit or a hydraulic unit. The ejector ejects the working fluid.

According to the tilting mechanism of the present invention, the spindle body can be tilted even when the moment load acting on the spindle is relatively small.

DETAILED DESCRIPTION

First Embodiment

Figure 1:
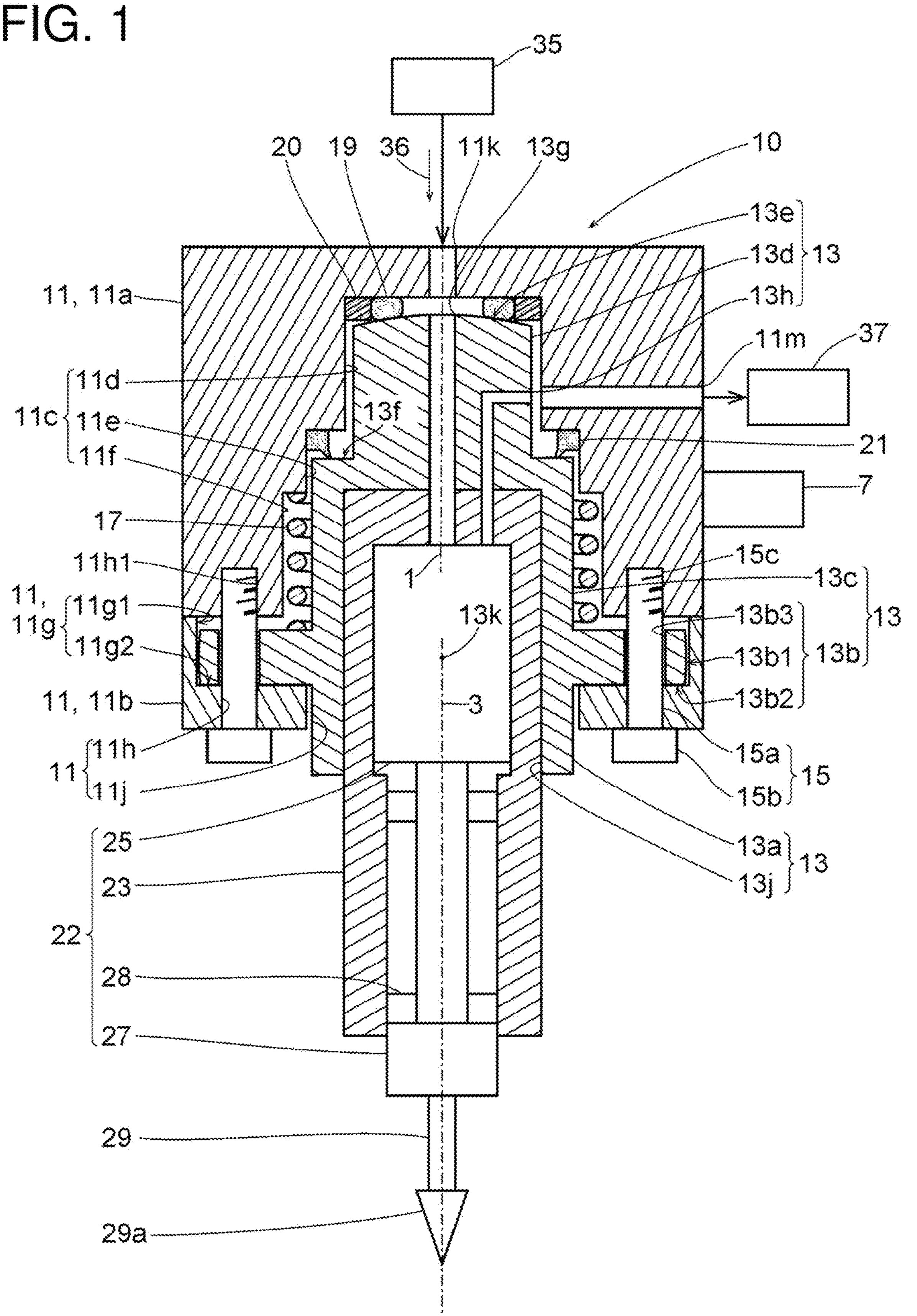
FIG. 1 is a sectional view of a tilting mechanism according to a first embodiment.

As shown in FIG. 1, a tilting mechanism 10 according to the present embodiment includes a reference axis 1, a housing 11, a body 13, an anti-rotation pin 15, a spring (elastic body) 17, a seal ring (first seal) 19, a backup ring 20, a lip seal (second seal) 21, and a spindle body (attachment) 22. The tilting mechanism 10 may include a tool axis (attachment axis) 3, an air source (working fluid source) 35, a silencer (ejector) 37, and a moving device 7. FIG. 1 is a sectional view of the tilting mechanism 10 taken along a plane passing through the reference axis 1. The tilting mechanism 10 is a deburring tool. Hereinafter, the lower direction in FIG. 1 is referred to as a distal end direction, and the upper direction in FIG. 1 is referred to as a basal end direction.

The tilting mechanism 10 is installed to the moving device 7. The moving device 7 is, for example, a machining tool or a robot. The robot is, for example, an orthogonal axis robot, a vertical articulated robot, a horizontal articulated robot, or a parallel link robot.

The tilting mechanism 10 may be connected to the air source 35 or the silencer 37. The air source 35 supplies compressed air (working fluid) 36 to the tilting mechanism 10. The silencer 37 discharges the compressed air 36.

The housing 11 has a columnar shape extending along the reference axis 1. The housing 11 has, for example, a cylindrical shape or a quadrangular prism shape centered on the reference axis 1. The housing 11 includes a body chamber 11*c*, a flange chamber 11*g*, and a body hole 11*j* in this order from the basal end. The body chamber 11*c*, the flange chamber 11*g*, and the body hole 11*j* are connected to each other. The housing 11 includes a pin hole 11*h*, a housing supply port 11*k*, and a housing discharge port 11*m*.

The housing 11 is divided into a case 11*a* and a cover 11*b*. The case 11*a* and the cover 11*b* are divided, for example, at the basal end of the flange chamber 11*g*.

The body chamber 11*c* has a stepped cylindrical shape centered on the reference axis 1. The body chamber 11*c* includes a small diameter portion 11*d*, a large diameter portion 11*e*, and a spring chamber (elastic member chamber) 11*f*. The small diameter portion 11*d*, which is a right cylinder, is located at a basal end of the body chamber 11*c*. The large diameter portion 11*e* is located in a middle portion of the body chamber 11*c* to be connected to the small diameter portion 11*d*. The large diameter portion 11*e* is a right cylinder having a diameter larger than the small diameter portion 11*d*. The spring chamber 11*f* is located at a distal end of the body chamber 11*c*. The spring chamber 11*f* is a right cylinder having a larger diameter than the large diameter portion 11*e*.

The flange chamber 11*g* is disc-shaped having a larger diameter than the spring chamber 11*f*. The flange chamber 11*g* includes a receiving surface 11*g*1 and an abutment surface 11*g*2. The receiving surface 11*g*1, which is an inner side surface of the flange chamber 11*g*, is a right cylindrical surface centered on the reference axis 1. The abutment surface 11*g*2 is a distal end surface of the flange chamber 11*g*. Preferably, the abutment surface 11*g*2 is a plane perpendicular to the reference axis 1.

The body hole 11*j*, which has a smaller diameter than the flange chamber 11*g*, opens into the distal end of the housing 11.

The pin hole 11*h* extends parallel to the reference axis 1. The pin hole 11*h* extends from the distal end of the housing 11 to the flange chamber 11*g*. The pin hole 11*h* may pass through the cover 11*b* to the case 11*ea*. For example, the pin hole 11*h* is a bottomed hole located through the basal end surface of the flange chamber 11*g*. The pin hole 11*h* may have an internal thread 11*h*1. The internal thread 11*h*1 may be located at the basal end of the flange chamber 11*g*. A plurality of the pin holes 11*h* are evenly arranged on the circumference.

The housing supply port 11*k* is located at a basal end of the housing 11. The housing supply port 11*k* extends along the reference axis 1 to be connected to the body chamber 11*c*. For example, the housing supply port 11*k* is connected to the center of the bottom of the small diameter portion 11*d*. The housing supply port 11*k* is connected to the air source 35.

The housing discharge port 11*m*, which is located at an outer peripheral portion of the housing 11, is connected to the body chamber 11*c*. For example, the housing discharge port 11*m* is connected to a cylindrical surface that is a side surface of the small diameter portion 11*d*. The housing discharge port 11*m* is connected to the silencer 37.

The body 13 has a right cylindrical shape centered on the tool axis (attachment axis) 3. The body 13 is swingably disposed in the body chamber 11*c*. The body 13 includes a distal end portion 13*a*, a flange 13*b*, a central portion 13*c*, a stepped portion 13*f*, a basal end portion 13*d*, and a second spherical surface 13*e* in this order from the distal end. The distal end portion 13*a*, the flange 13*b*, the central portion 13*c*, the stepped portion 13*f*, the basal end portion 13*d*, and the second spherical surface 13*e* are connected to each other. The body 13 may include one or more body supply port 13*g*, one or more body discharge port 13*h*, and an attachment chamber 13*j*.

The distal end portion 13*a*, which is cylindrical shape, is connected to the distal end of the flange 13*b*. The distal end portion 13*a* may protrude from the housing 11.

The flange 13*b* includes a first spherical surface 13*b*1, a contact surface 13*b*2, and a anti-rotation hole (receiving portion) 13*b*3. The first spherical surface 13*b*1 is a spherical surface having a center 13*k*. The center 13*k* is located on the tool axis 3. The first spherical surface 13*b*1 abuts the receiving surface 11*g*1. The diameter 12 (see FIG. 2) of the first spherical surface 13*b*1 is substantially the same as or slightly smaller than the diameter 14 (see FIG. 2) of the receiving surface 11*g*1. Specifically, the diameter 12 is between 95% and 100% of the diameter 14, preferably between 97% and 100%, for example between 97% and 99%. The center 13*k* is located at a central portion in a thickness direction of the flange 13*b*. The center 13*k* is located substantially on the reference axis 1. The contact surface 13*b*2 is located at a distal end of the flange 13*b*. The cross-section of the anti-rotation hole 13*b*3 is circular or rectangular.

The central portion 13*c* and the basal end portion 13*d* are right cylinders centered on the tool axis 3. The basal end portion 13*d* has a diameter smaller than the central portion 13*c*. The central portion 13*c* and the basal end portion 13*d* are connected to each other by the stepped portion 13*f*. The stepped portion 13*f* is, for example, a flat surface. The stepped portion 13*f* may be a conical surface or a spherical surface. The central portion 13*c* is disposed in the large diameter portion 11*e* or the spring chamber 11*f*. The basal end portion 13*d* is disposed in the small diameter portion 11*d*.

The second spherical surface 13*e* is located at the basal end of the body 13. The second spherical surface 13*e* is a spherical surface having the center 13*k*. That is, the first spherical surface 13*b*1 and the second spherical surface 13*e* are concentric.

The attachment chamber 13*j* is located at a distal end portion of the body 13. The attachment chamber 13*j* is, for example, a right cylindrical shape.

The body supply port 13*g* is located at a basal end portion of the second spherical surface 13*e*. The body supply port 13*g* extends along the tool axis 3. The body supply port 13*g* is connected to the attachment chamber 13*j* and the housing supply port 11*k*.

The body discharge port 13*h* is located on a cylindrical surface of the basal end portion 13*d*. For example, a plurality of the body discharge ports 13*h* are evenly arranged on the circumference. The body discharge port 13*h* is connected to the attachment chamber 13*j* and the housing discharge port 11*m*.

The body 13 is urged by a spring 17. When the body 13 is not tilted from the reference axis 1, the contact surface 13*b*2 abuts against the abutment surface 11*g*2.

The anti-rotation pin 15 includes a head 15*b*, a shaft portion 15*a*, and a fastening portion 15*c* in this order from the distal end. The anti-rotation pin 15 has a bolt shape. The anti-rotation pin 15 fixes the cover 11*b* to the case 11*a*. The head 15*b* abuts against the cover 11*b*. The fastening portion 15*c*, which has an external thread, is fastened to the internal thread 11*h*1. The shaft portion 15*a* abuts against the anti-rotation hole 13*b*3.

The spring 17 is a compression coil spring. The spring 17 is disposed between the spring chamber 11*f* and the flange 13*b*. The spring 17 may be guided by an inner wall surface of the spring chamber 11*f* or the central portion 13*c*. The spring 17 urges the body 13 toward the distal end.

The elastic body may be, for example, a rubber or a three-dimensional spring instead of the spring 17. The spring 17 may be disposed between the small diameter portion 11*d* and the stepped portion 13*f*. A plurality of springs 17 may be disposed between the flange chamber 11*g* and the flange 13*b*.

The seal ring 19 has, for example, a circular or X-shaped cross section. The seal ring 19 is, for example, a ring of synthetic rubber or natural rubber. The seal ring 19 is disposed on the basal end surface of the small diameter portion 11*d*. The seal ring 19 seals between the small diameter portion 11*d* and the second spherical surface 13*e*. The compressed air 36 passes through the inside of the seal ring 19 to be supplied from the housing supply port 11*k* to the body supply port 13*g*. The seal ring 19 separates the housing supply port 11*k* from the housing discharge port 11*m*.

The backup ring 20 has, for example, a rectangular cross section. The backup ring 20 is disposed radially outward of the seal ring 19. The backup ring 20 holds the seal ring 19. The backup ring 20 is, for example, a resin ring.

The lip seal 21 is disposed at the basal end portion of the large diameter portion 11*e*. The lip seal 21 includes a lip that abuts against the stepped portion 13*f*. The lip seal 21 seals a gap between the body chamber 11*c* and the body 13.

The spindle body 22 includes a tool casing 23, a spindle motor 25, a spindle 27, and a spindle bearing 28. The spindle body 22 is attached to the body 13. The tool casing 23, which has a hollow cylindrical shape, is disposed in the attachment chamber 13*j*.

The spindle motor 25 is disposed in the tool casing 23. The spindle motor 25 is a fluid motor, preferably an air motor. The spindle motor 25 is connected to the body supply port 13*g* and the body discharge port 13*h*. The spindle motor 25 is rotated by the compressed air 36 supplied from the body discharge port 13*h*, and discharges the compressed air 36 through the body discharge port 13*h*.

The spindle 27 is supported by the tool casing 23 with the spindle bearing 28. The spindle 27 is connected to the spindle motor 25. The spindle 27 is rotated by the spindle motor 25. A tip tool 29 is attached to the spindle 27. The tip tool 29 has a cutting edge 29*a*.

The abutment surface 11*g*2 may be a right conical surface centered on the reference axis 1. At this time, the contact surface 13*b*2 may be a right conical surface centered on the tool axis 3. At this time, the abutment surface 11*g*2 and the contact surface 13*b*2 have the same apex angle.

When the spindle body 22 is not a fluidic device, the housing supply port 11*k*, the body supply port 13*g*, the seal ring 19, the backup ring 20, the housing discharge port 11*m*, the body discharge port 13*h*, the lip seal 21, and the second spherical surface 13*e* may be omitted.

Figure 2:
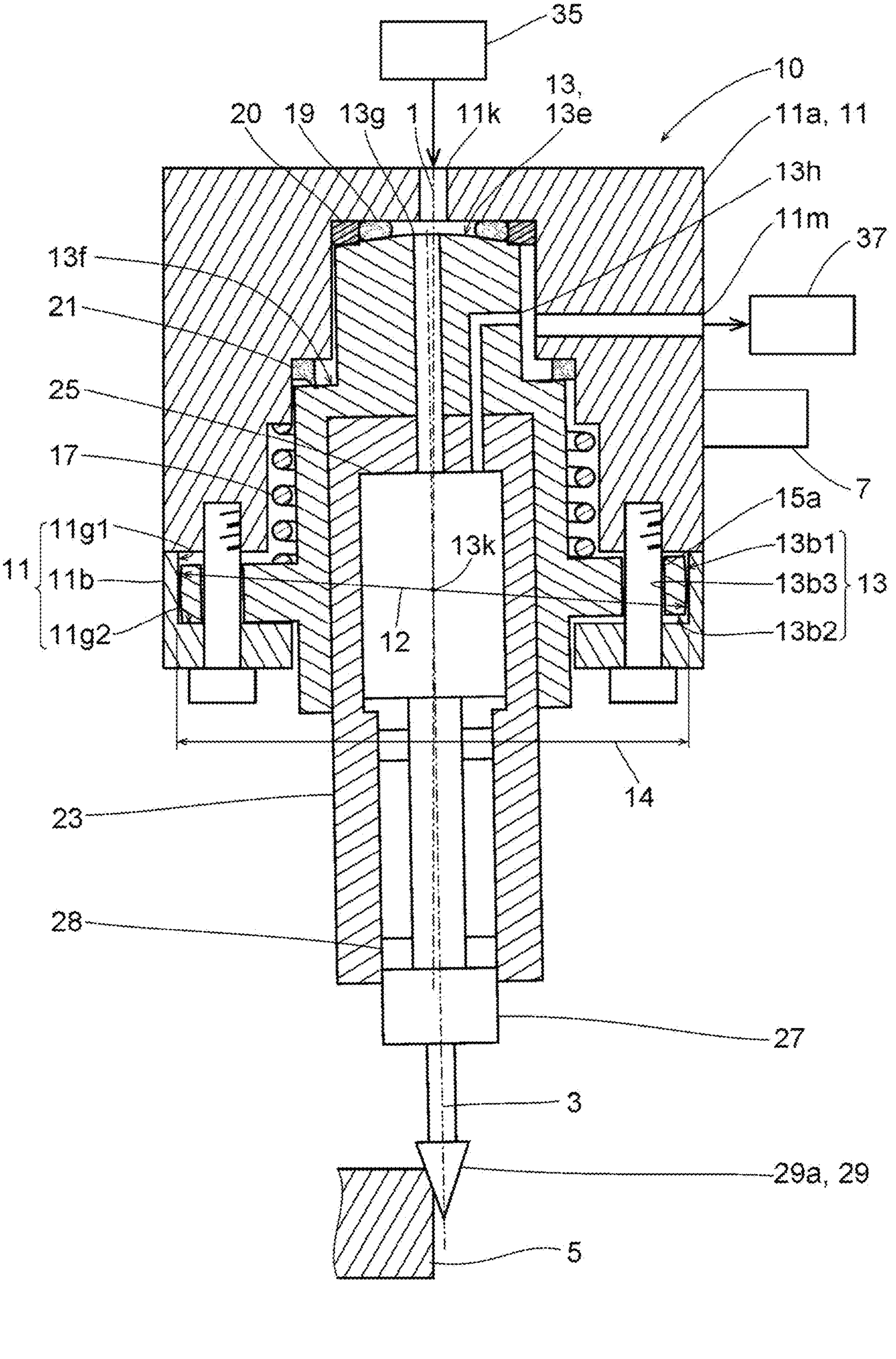
FIG. 2 is a sectional view of the tilting mechanism according to the first embodiment in use.

The tilting mechanism 10 in use will be described with reference to FIG. 2. FIG. 2 shows a sectional view of the tilting mechanism 10 in a state in which the tip tool 29 is in contact with a workpiece 5 and the spindle body 22 is tilted.

First, the air source 35 supplies the compressed air 36 to the spindle motor 25 through the housing supply port 11*k*, the body chamber 11*c*, and the body supply port 13*g*. The spindle motor 25 thus rotates the spindle 27 and the tip tool 29. The compressed air 36 is discharged from the spindle motor 25 through the body discharge port 13*h*, the body chamber 11*c*, the housing discharge port 11*m*, and the silencer 37. The anti-rotation hole 13*b*3 abuts against the shaft portion 15*a* of the anti-rotation pin 15, which prevents the body 13 from rotating. The moving device 7 then brings the cutting edge 29*a* into contact with the side surface of the workpiece 5. The body 13 receives a moment load from the workpiece 5. At this time, the contact surface 13*b*2 is separated from the abutment surface 11*g*2 against the elastic force of the spring 17 and the pressure of the compressed air 36. The first spherical surface 13*b*1 contacts the receiving surface 11*g*1. The body 13 then tilts about the center 13*k*. The second spherical surface 13*e* contacts the seal ring 19 and pivots with the seal ring 19 collapsed.

According to the tilting mechanism 10 of the present embodiment, the body 13 is urged toward the distal end by the elastic force of the spring 17 and the pressure of the compressed air 36. When a moment load is not applied to the spindle body 22, the contact surface 13*b*2 abuts against the abutment surface 11*g*2. The first spherical surface 13*b*1 is guided to the receiving surface 11*g*1. The center 13*k* of the first spherical surface 13*b*1 is thus located very close to the reference axis 1. Thereby, the tool axis 3 and the reference axis 1 are substantially identical. Here, substantially the same means that the tool axis 3 and the reference axis 1 are parallel to each other, and the deviation between the tool axis 3 and the reference axis 1 is sufficiently smaller than the cut amount of the cutting edge 29*a* with respect to the workpiece 5. For example, the deviation of the tool axis 3 from the reference axis 1 is within 0.5 mm, preferably within 0.2 mm.

As the first spherical surface 13*b*1 abuts against the receiving surface 11*g*1, the body 13 can be smoothly tilted about the center 13*k* of the first spherical surface 13*b*1.

The second spherical surface 13*e* contacts the seal ring 19. The second spherical surface 13*e* is disposed to collapse the seal ring 19. The second spherical surface 13*e* has the same center 13*k* as the first spherical surface 13*b*1, and the body 13 tilts about the center 13*k*. Thus, even when the body 13 is tilted, the crushing margin of the seal ring 19 is kept substantially uniform. The seal ring 19 thus evenly urges the body 13 toward the distal end on the circumference.

The seal ring 19 separates the housing supply port 11*k* and the body supply port 13*g* from the housing discharge port 11*m* and the body discharge port 13*h*. The pressure of the compressed air 36 supplied to the spindle body 22 is thus maintained.

Second Embodiment

Figure 3:
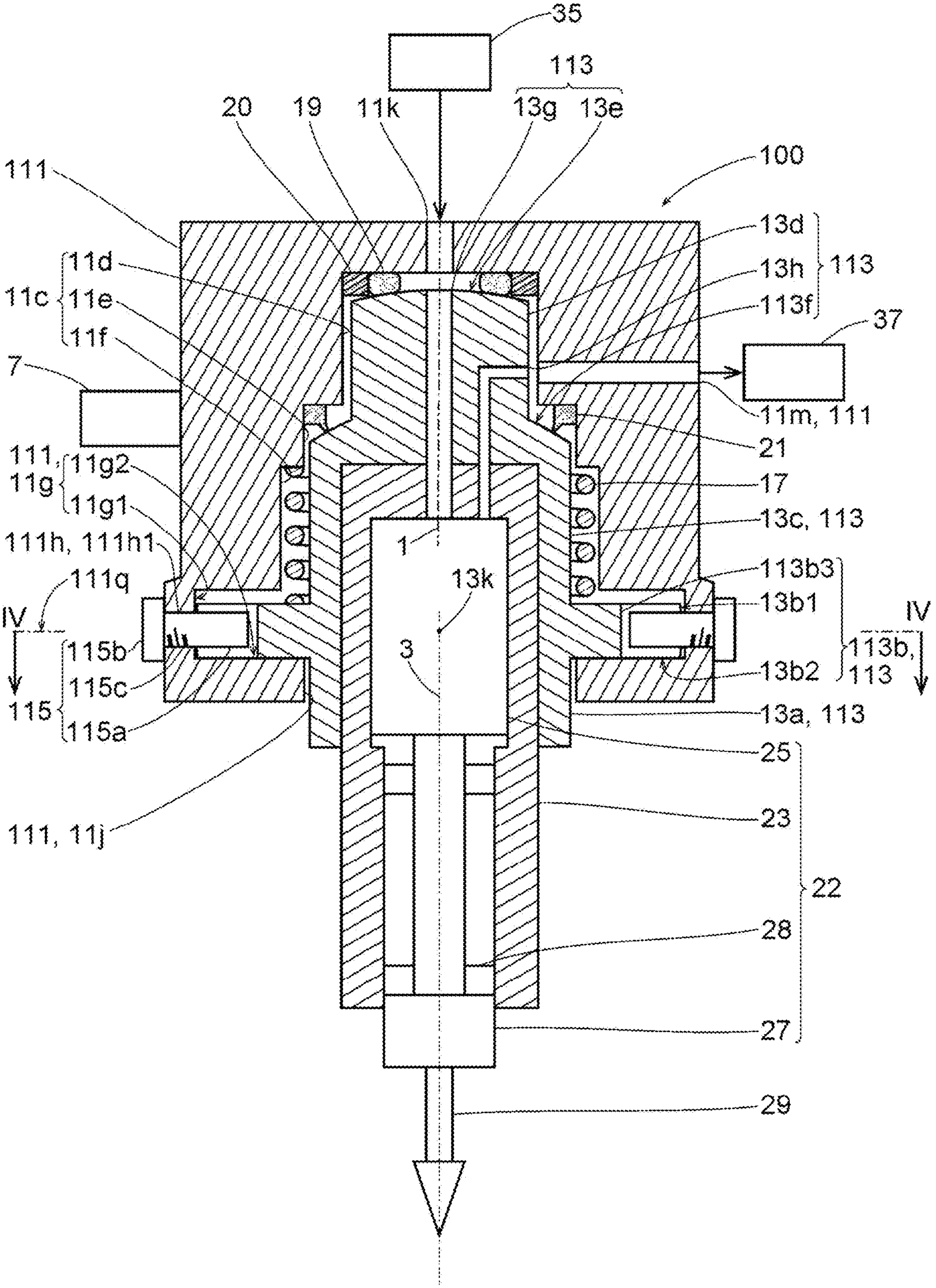
FIG. 3 is a sectional view of a tilting mechanism according to a second embodiment.
Figure 4:
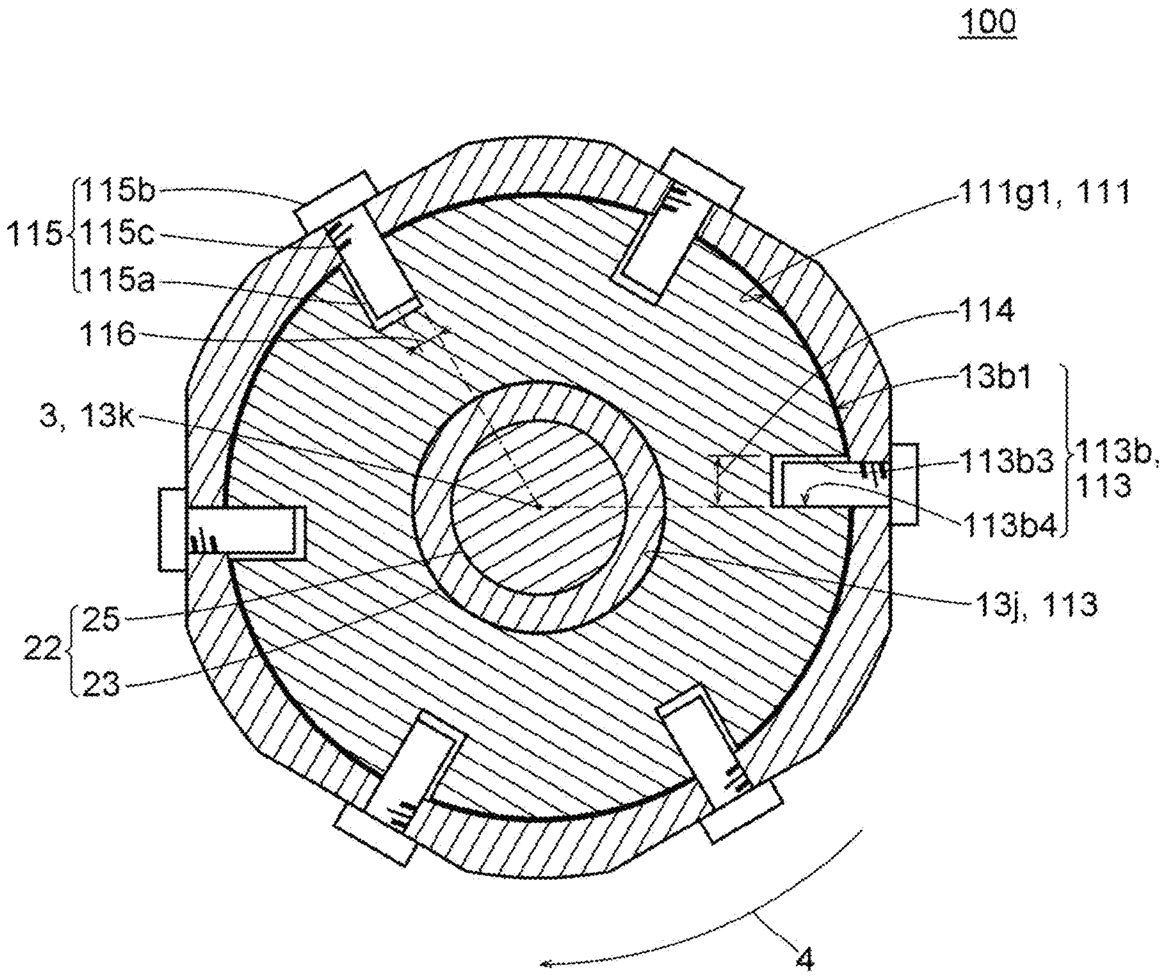
FIG. 4 is a cross-sectional view taken along line IV-IV in FIG. 3.

As shown in FIGS. 3 and 4, the tilting mechanism 100 according to the present embodiment includes a housing 111, a body 113, an anti-rotation pin 115, a spindle body 22, a spring 17, a seal ring 19, a backup ring 20, and a lip seal 21.

The housing 111 includes a body chamber 11*c*, a flange chamber 11*g*, a body hole 11*j*, a pin hole 111*h*, a housing supply port 11*k*, and a housing discharge port 11*m*. The pin hole 111*h* is arranged perpendicular to the reference axis 1 and on a pin installation plane 111*q*. The pin hole 111*h* has an internal thread 111*h*1.

The anti-rotation pin 115 has a bolt shape. The anti-rotation pin 115 includes a head portion 115*b*, a fastening portion 115*c*, and a shaft portion 115*a* in this order from the radially outside. The shaft portion 115*a* is a right cylinder. The head portion 115*b* abuts against the housing 111. The fastening portion 115*c*, which is an external thread, is fastened to the internal thread 111*h*1. As shown in FIG. 4, the pin hole 111*h* and the anti-rotation pin 115 extend radially. The center of the anti-rotation pin 115 is offset on the pin installation plane 111*q* in a direction opposite to the rotational direction 4 of the spindle 27 by a radius 116 of the shaft portion 115*a* from an abutment surface 113*b*4 to be described later.

The shaft portion 115*a* may have a bulging portion (not shown). The bulging portion is, for example, spherical.

As shown in FIG. 3, the body 113 includes a distal end portion 13*a*, a flange 113*b*, a central portion 13*c*, a basal end portion 13*d*, a second spherical surface 13*e*, a stepped portion 113*f*, a body supply port 13*g*, and a body discharge port 13*h*.

The flange 113*b* includes a first spherical surface 13*b*1, a contact surface 13*b*2, and an anti-rotation groove (receiving portion) 113*b*3. In a normal state in which the contact surface 13*b*2 abuts against the abutment surface 11*g*2, the center 13*k* is located on the pin installation plane 111*q*. The anti-rotation groove 113*b*3 penetrates the flange 113*b* in a direction parallel to the tool axis 3 (up-down direction in FIG. 3). As shown in FIG. 4, the anti-rotation groove 113*b*3 has a rectangular cross-section when viewed in the direction of the tool axis 3. The anti-rotation groove 113*b*3 has an abutment surface 113*b*4. A width 114 of the anti-rotation groove 113*b*3 is slightly greater than twice the radius 116 of the shaft portion 115*a*. The anti-rotation groove 113*b*3 extends radially. The anti-rotation groove 113*b*3 is offset in the opposite direction of the rotational direction 4 from the abutment surface 113*b*4 on the pin installation plane 111*q*. The abutment surface 113*b*4 is a surface of the anti-rotation groove 113*b*3 in the rotational direction 4. The abutment surface 113*b*4 is a plane passing through the tool axis 3. The abutment surface 113*b*4 abuts against the shaft portion 115*a*.

The stepped portion 113*f* is a spherical surface having the center 13*k*.

The tilting mechanism 100 according to the present embodiment includes the anti-rotation pin 115 extending in the radial direction. It is thus easy to reduce the size of the tilting mechanism 100. Further, the tilt width is easier to increase than the tilting mechanism 10 of the first embodiment. When the body 113 is tilted, the anti-rotation groove 113*b*3 slides at the contacting portion with the anti-rotation pin 115. This promotes the body 113 to tilt smoothly.

The tilting mechanism 100 according to the present embodiment is a spherical surface in which the stepped portion 113*f* has the center 13*k*. Thus, even when the body 113 is tilted, there is little change in the tilting of the lip of the lip seal 21. This causes the body 113 to tilt smoothly. Further, the life of the lip seal 21 is extended.

Third Embodiment

Figure 5:
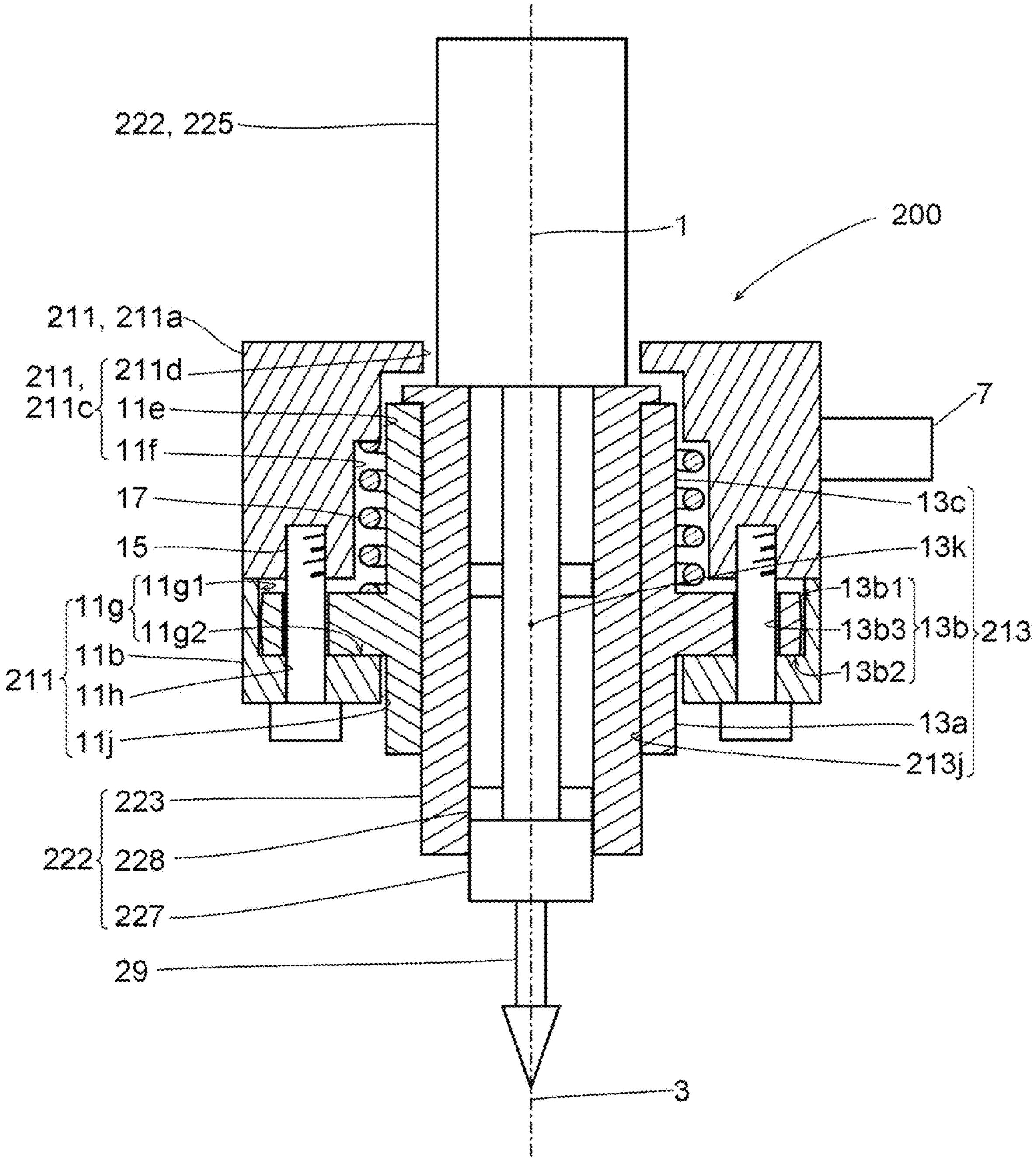
FIG. 5 is a sectional view of a tilting mechanism according to a third embodiment.

As shown in FIG. 5, the tilting mechanism 200 according to the present embodiment includes a housing 211, a body 213, a spring 17, an anti-rotation pin 15, and a spindle body (attachment) 222.

The housing 211 includes a case 211*a* and a cover 11*b*. The case 211*a* includes a body chamber 211*c*. The body chamber 211*c* includes a small diameter portion 211*d*, a large diameter portion 11*e*, and a spring chamber 11*f*. The small diameter portion 211*d* penetrates the basal end of the case 211*a*. The case 211*a* is formed by cutting the basal end portion of the case 11*a* of the first embodiment to the distal end of the small diameter portion 11*d*. The case 211*a* does not have a flow path for compressed air 36.

The body 213 includes a central portion 13*c*, a flange 13*b*, a distal end portion 13*a*, and an attachment chamber 213*j*. The attachment chamber 213*j* extends along the tool axis 3 to pass through the body 213. The body 213 is shaped such that the basal end portion 13*d* of the body 13 of the first embodiment is cut and penetrates the attachment chamber. The body 213 does not have a flow path for compressed air 36.

The spindle body 222 includes a tool casing 223, a spindle bearing 228, a spindle 227, and a spindle motor 225. The tool casing 223 passes through the attachment chamber 213*j*. The spindle motor 225 is disposed at a basal end portion of the tool casing 223. The spindle motor 225 is, for example, an electric motor. The spindle 227 is supported by the tool casing 223 with the spindle bearing 228 to be connected to the spindle motor 225. The tip tool 29 is attached to the spindle 227.

The tilting mechanism 200 according to the present embodiment can be configured to be compact. The present invention thus can be suitably applied to a scraper-type deburring tool (attachment) 322 (see FIG. 6).

Figure 6:
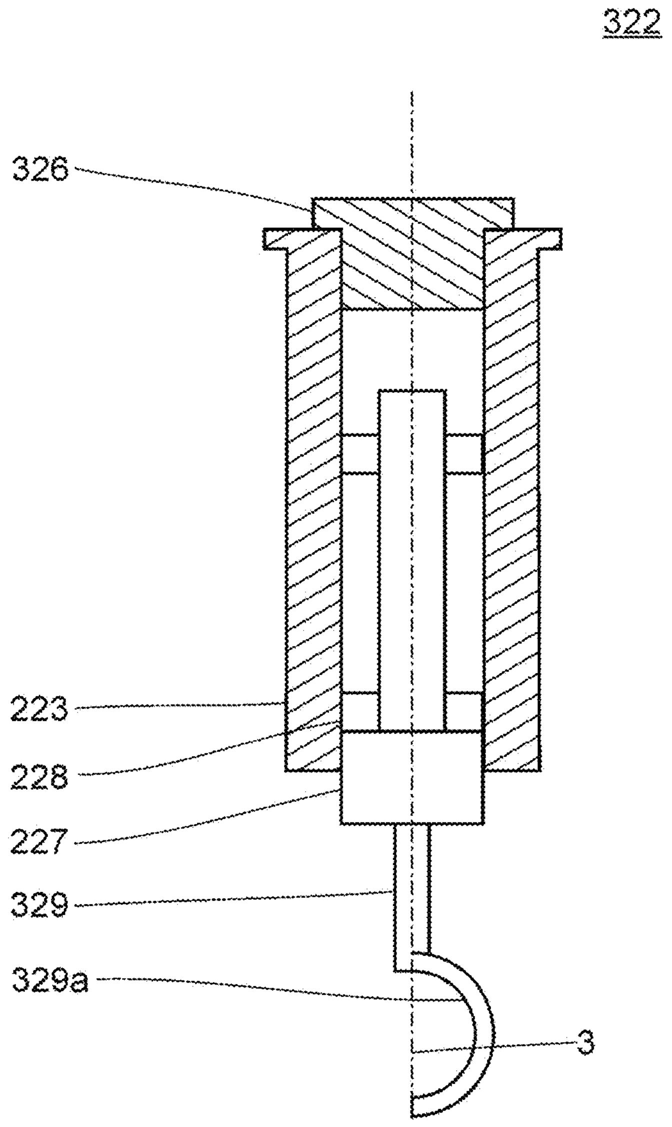
FIG. 6 is a sectional view of a deburring tool according to a modification of the third embodiment.

As shown in FIG. 6, the deburring tool 322 includes a tool casing 223, a spindle bearing 228, a spindle 227, a cover 326, and a tip tool 329. The cover 326 covers the basal end of the tool casing 223. The tip tool 329 is attached to the spindle 227. The tip tool 329 includes a scraper 329*a*. The scraper 329*a*, which has a semi-circular arc shape, has scraper blades inside the circular arc.

When the scraper-type deburring tool 322 is attached to the tilting mechanism 200, the tilting mechanism 200 is configured to be compact and inexpensive as the tilting mechanism 200 does not include a driver.

The present invention is not limited to the above-described embodiments, and various modifications can be made without departing from the gist of the present invention, and all technical matters included in the technical idea described in the claims are the subject of the present invention. While the above embodiments have been shown by way of example, those skilled in the art will recognize that various alternatives, modifications, variations, and improvements can be made from the disclosure herein, which fall within the scope of the appended claims.

REFERENCE SIGNS LIST

1 Reference axis
10, 100, 200 Tilting mechanism
11, 111, 211 Housing
11*c*, 211*c* Body chamber

11*g*1 Receiving surface
11*g*2 Abutment surface
13, 113, 213 Body
13*b*1 First spherical surface
13*b*2 Contact surface
17 Spring (Elastic body)
15, 115 Anti-rotation pin (Anti-rotation member)

What is claimed is:

1. A tilting mechanism, comprising:
a housing including
a body chamber extending along a reference axis,
a receiving surface located at a distal end portion of the body chamber, and
an abutment surface,
a body disposed inside the body chamber in a tiltable manner with respect to the reference axis, the body including
a first spherical surface configured to come in contact with the receiving surface, and
a contact surface configured to come in contact with the abutment surface,
an elastic member disposed in the body chamber, the elastic member configured to urge the body toward a distal end; and
an anti-rotation member disposed in the housing to prevent rotation of the body;
wherein the housing includes a housing supply port connected to a basal end of the body chamber to supply working fluid to the body chamber,
the body includes a body supply port located at a basal end of the body to be connected to the housing supply port, and
the tilting mechanism further comprising:
a first seal disposed in the body chamber, the first seal connecting the housing supply port and the body supply port to seal a gap between the body chamber and the body.

2. The tilting mechanism according to claim 1, wherein
the abutment surface is located in a distal end portion of the body chamber, and
the contact surface is located on a distal end portion of the body.

3. The tilting mechanism according to claim 2, wherein the receiving surface is a right cylindrical surface.

4. The tilting mechanism according to claim 2, wherein the abutment surface is a plane perpendicular to the reference axis.

5. The tilting mechanism according to claim 2, wherein
the body chamber includes an elastic member chamber, and
the elastic member is disposed in the elastic member chamber to be guided by the elastic member chamber or the body.

6. The tilting mechanism according to claim 1, wherein the receiving surface is a right cylindrical surface.

7. The tilting mechanism according to claim 6, wherein the abutment surface is a plane perpendicular to the reference axis.

8. The tilting mechanism according to claim 6, wherein
the body chamber includes an elastic member chamber, and
the elastic member is disposed in the elastic member chamber to be guided by the elastic member chamber or the body.

9. The tilting mechanism according to claim 1, wherein the abutment surface is a plane perpendicular to the reference axis.

10. The tilting mechanism according to claim 9, wherein
the body chamber includes an elastic member chamber, and
the elastic member is disposed in the elastic member chamber to be guided by the elastic member chamber or the body.

11. The tilting mechanism according to claim 1, wherein
the body chamber includes an elastic member chamber, and
the elastic member is disposed in the elastic member chamber to be guided by the elastic member chamber or the body.

12. The tilting mechanism according to claim 1, wherein
the body includes a flange including
an outer circumferential surface being the first spherical surface, and
the contact surface located at the distal end.

13. The tilting mechanism according to claim 2, wherein
the body chamber includes an elastic member chamber, and
the elastic member is disposed in the elastic member chamber to be guided by the elastic member chamber or the body.

14. The tilting mechanism according to claim 1, further comprising:
an attachment attached to the body, the attachment including
a spindle to which a tip tool is attachable, the spindle rotatably supported by the body,
a spindle motor connected to the spindle, the spindle motor disposed in the body.

15. The tilting mechanism according to claim 8, wherein
the body includes a second spherical surface coming in contact with the first seal at a basal end, the second spherical surface being concentric with the first spherical surface.

16. The tilting mechanism according to claim 1, wherein
the housing includes a housing discharge port connected to the body chamber, the housing discharge port separated from the housing supply port and the body supply port by the first seal, and
the body includes a body discharge port connected to the attachment and the body chamber,
the tilting mechanism further comprising:
a second seal disposed toward distal end from the housing discharge port and the body discharge port to seal a gap between the housing and the body.

17. The tilting mechanism according to claim 16, wherein
a spindle motor is connected to the body discharge port.

18. The tilting mechanism according to claim 1, wherein
the body includes a receiving portion located in a flange, and
the anti-rotation member is disposed in the housing to be inserted in the receiving portion.

19. The tilting mechanism according to claim 1, wherein
a spindle motor is connected to the body supply port to be rotated by the working fluid.

* * * * *